United States Patent [19]
Hashimoto et al.

[11] Patent Number: 5,336,561
[45] Date of Patent: Aug. 9, 1994

[54] MAGNETIC RECORDING MEDIUM

[75] Inventors: Hiroshi Hashimoto; Akira Ushimaru; Kenichi Masuyama; Yasuyuki Tanaka; Hiroyuki Kobayashi, all of Kanagawa, Japan

[73] Assignee: Fuji Photo Film Co., Ltd., Kanagawa, Japan

[21] Appl. No.: 868,096

[22] Filed: Apr. 14, 1992

[30] Foreign Application Priority Data

Apr. 19, 1991 [JP] Japan ................................. 3-088781

[51] Int. Cl.$^5$ ............................ B32B 5/16; G11B 5/66
[52] U.S. Cl. .................................. 428/336; 428/425.9; 428/475.2; 428/480; 428/483; 428/692; 428/694 B; 428/694 BS; 428/694 BG; 428/694 BR; 428/694 SL; 428/900
[58] Field of Search ............... 428/336, 425.9, 480, 428/483, 475.2, 692, 694, 900, 694 B, 694 BS, 694 BG, 694 BR, 694 SL; 427/131, 127

[56] References Cited

U.S. PATENT DOCUMENTS

| 4,504,542 | 3/1985 | Miyoshi et al. | 428/336 |
| 4,619,856 | 10/1986 | Kamada et al. | 428/143 |
| 4,664,964 | 5/1987 | Okita et al. | 428/143 |
| 4,664,965 | 5/1987 | Okita et al. | 428/143 |
| 4,775,593 | 10/1988 | Heberger et al. | 428/411.1 |

Primary Examiner—Paul J. Thibodeau
Assistant Examiner—Leszek Kiliman
Attorney, Agent, or Firm—Sughrue, Mion, Zinn, Macpeak & Seas

[57] ABSTRACT

A magnetic recording medium comprising a non-magnetic support having thereon an undercoating layer and a magnetic layer, wherein the undercoating layer is provided between the non-magnetic support and magnetic layer, and a binder used for the undercoating layer comprises a resin having an elution amount of 0.05 to 0.4 mg/cm$^2$ when placed in a mixed solvent of methyl ethyl ketone and cyclohexanone having a weight ratio of 1:1 at 25° C. for 30 seconds.

12 Claims, No Drawings

MAGNETIC RECORDING MEDIUM

FIELD OF THE INVENTION

The present invention relates to a magnetic recording medium having an undercoating layer between a non-magnetic support and a magnetic layer; more specifically, the present invention relates to a magnetic recording medium having an undercoating layer which is not eroded by a highly polar solvent used for the magnetic layer.

BACKGROUND OF THE INVENTION

In general, a magnetic recording medium comprising a non-magnetic support having thereon a magnetic layer containing ferromagnetic powders, such as γ-iron oxide, Co-containing iron oxide, $CrO_2$ and ferromagnetic metal powders each dispersed in a binder, is used for tape magnetic recording mediums for, for example, audio, video, and computer and disc magnetic recording mediums for, for example, floppy discs. The non-magnetic support used for this magnetic recording medium is usually made of polyethylene terephthalate, polyethylene naphthalate and the like. These supports have a high mechanical strength and an excellent anti-solvent property since they are extended and highly crystallized.

The magnetic layer, provided by applying a coating solution prepared by dispersing ferromagnetic powders in a binder on a non-magnetic support, is fragile due to a high filling degree of the ferromagnetic powders and a small breaking extension; and therefore, the magnetic layer formed without providing an undercoating layer is readily broken with mechanical strength applied thereto, and peeled off from the non-magnetic support in several instances. In order to strongly adhere the magnetic layer to the non-magnetic support, it is the easiest and safest approach to provide an undercoating layer, e.g., as used in applying paint. With respect to this undercoating, various attempts have been made in the past; namely, JP-B-47-22071 (the term "JP-B" as used herein means an examined Japanese patent publication), JP-B49-10243, JP-A-52-42703 (the term "JP-A" as used herein means an unexamined published Japanese patent application), and JP-A-59-19230. However, these were not satisfactory.

Further, the approaches in which polyester resins were used as the resin for an undercoating layer in order to improve the adherence property with polyethylene terephthalate were disclosed in JP-B-62-37451, JP-A-56-87233, JP-A-60-11358, JP-A-60-19522, JP-A-60-21250, JP-A-61-264510, and JP-A-1-245421.

In view of recent developments in the art, a greater smoothness is required for the magnetic recording media for which a high recording density is requested; e.g., S-VHS, 8 mm video, Hi-8 and Hi-vision. Further, in keeping step with the trend toward compactness, a thinner magnetic recording medium and a thinner magnetic layer are required.

In order to achieve a high recording density, a high dispersion of ferromagnetic fine powders is needed. Consequently, the binders into which a hydrophilic group, such as COOH, $SO_3Na$ and a group having a phosphoric acid group, are used for the magnetic layer; and to dissolve the binders, the solvents themselves (which are used for magnetic paint) have been partly switched from conventional solvents such as MIBK, toluene and MEK, to the solvents having a high hydrophilic property and dissolubility, such as cyclohexane.

When a conventional undercoating layer is applied to the magnetic recording medium, the undercoating layer is dissolved by the solvent contained in the magnetic paint, and is diffused into the magnetic layer during the period between coating and drying. Therefore, the adhesive strength between the magnetic layer and non-magnetic support is lowered. Further, in the case of a thin magnetic layer, an undercoating layer, which is unevenly swollen, lowers the smoothness of the magnetic layer. The problem has been clearly shown that the thinner and smoother the magnetic layer is, the more notably this phenomenon takes place and the electromagnetic characteristics are lowered.

The grain sizes of ferromagnetic powders (which become finer) together with the tendency toward high recording density, results in further hardening the magnetic layer and weakening the mechanical strength thereof. Further, the adhesive strength between the magnetic layer and non-magnetic support is lowered, and an increased dropout is due to a deteriorated durability and repeated running.

It has been found that a conventional undercoating layer cannot apply to such magnetic recording medium as used for high density recording.

SUMMARY OF THE INVENTION

The object of the present invention is to provide a magnetic recording medium having excellent electromagnetic characteristics and running durability. Another object of the present invention is to provide a recording medium where the smoothness of the magnetic layer is excellent, and the adhesive strength between the magnetic layer and non-magnetic support is excellent.

The above objects of the present invention can be achieved by a magnetic recording medium comprising a non-magnetic support and a magnetic layer provided thereon, wherein an undercoating layer is provided between the non-magnetic support and magnetic layer, and a binder used for the undercoating layer comprises a resin having an elution amount of 0.05 to 0.4 $mg/cm^2$ when placed in a mixed solvent of methyl ethyl ketone and cyclohexanone having a weight ratio of 1:1 at 25° C. for 30 seconds.

PREFERABLE EMBODIMENT OF THE PRESENT INVENTION

The above objects of the present invention can also be effectively achieved by a magnetic recording medium comprising a non-magnetic support, wherein an undercoating layer is provided between the non-magnetic support and magnetic layer, and a binder used for the above magnetic layer contains a resin having at least one polar group selected from the group consisting of —COOM, —$SO_3M$, —$PO_3M_2$, —$OSO_3M$ and —O-$PO_3M_2$, in which M represents a hydrogen atom, an alkali metal ion or an ammonium ion; and the binder used for the above undercoating layer is a resin containing 0.1 meq/g to 3 meq/g of at least one polar group selected from the group consisting of —COOM, —$SO_3M$, —$PO_3M_2$, —$OSO_3M$ and —$OPO_3M_2$, in which M represents a hydrogen atom, an alkali metal ion or an ammonium ion.

Further, the above objects of the present invention can be effectively achieved by a magnetic recording medium in which the resin having a polar group, which is used for the above undercoating layer, has preferably an elution amount of 0.4 mg/cm² or less to a solvent used for the above magnetic layer. Also, the above objects of the present invention can be effectively achieved by a magnetic recording medium in which the above magnetic layer has preferably a centerline average surface roughness (Ra) of 5 nm or less (a cutoff value: 0.25 mm), which is defined by JIS B 0601.

DETAILED DESCRIPTION OF THE INVENTION

In recent years, the binders having a polar group such as —COOH and —SO₃NA were used in order to increase the dispersibility of ferromagnetic powders, especially ferromagnetic alloy powders used for the magnetic layer, and the solvents having a high dissolubility were used in order to dissolve them.

In the present invention, if a resin having an elution amount of 0.05 to 0.4 mg/cm² when placed in a mixed solvent of methyl ethyl ketone and cyclohexanone (1:1 by weight ratio), is used for the undercoating layer, the binder used for the undercoating layer is not dissolved by the solvent used for the magnetic layer-coating solution. This ensures that the surface of the magnetic layer can be kept smooth and a necessary adhesive strength can be attained.

The magnetic recording medium of the present invention has the basic structure comprising a non-magnetic support, provided thereon an undercoating layer, and provided thereon a magnetic layer. Further, the magnetic layer according to the present invention comprises the ferro-magnetic powders dispersed in a binder.

Examples of the non-magnetic support used in the present invention include various synthetic resin films of polyethylene terephthalate, polyethylene naphthalate, polypropylene, polycarbonate, polyamide, polyaromatic amide (aramide), polyimide, and polyamide imide, and metal foils such as aluminum foil and stainless steel foil. Preferred are polyethylene terephthalate, polyethylene naphthalate, polyamide, polyaromatic amide ( aramide ), polyimide, and polyamide imide.

The non-magnetic support having the thickness of 2.5 to 100 μm, more preferably 3 to 80 μm, is usually used. The surface smoothness of the non-magnetic support is preferably 10 run or less as expressed by a centerline average surface roughness (Ra) (a cutoff value: 0.25 nun) according to JIS B 0601. When the non-magnetic support having the smoothness falling within this range is used, the effect of the smoothness of the present invention can be markedly improved.

The undercoating layer according to the present invention is characterized in that it contains a resin having an elution amount (i.e., a dissolved amount) of 0.05 to 0.4 mg/cm² (preferably 0.05 to 0.3 mg/cm²) to the mixed solvent of methyl ethyl ketone and cyclohexanone (1:1 by weight ratio) at 25° C., wherein the elution amount is measured by placing the resin film cast on a substrate, such as a PET film or glass plate, into the mixed solvent of methyl ethyl ketone and cyclohexanone (1:1 by weight ratio ) at 25° C. and removing it after 30 seconds to measure an eluted weight (which is expressed in terms of the amount converted per cm² of the surface area). When the elution amount exceeds this range, the undercoating layer is dissolved and diffused into the magnetic layer during the period from coating to drying, which results in lowering the adhesive strength between the magnetic layer and the non-magnetic support as well as lowering the surface smoothness of the magnetic layer. When it is below this range, the adhesive strength is lowered due to the decreased affinity between the undercoating layer and the magnetic layer.

The thickness of the undercoating layer of the present invention is preferably 0.01 to 0.2 μm and particularly preferably 0.02 to 0.1 μm. If the thickness of the undercoating layer is thicker than this range, the smoothness of the magnetic layer is adversely affected and, if the undercoating layer is thinner than this range, the adhesive strength may be insufficient.

Resins usually used for the undercoating layer in the present invention include a polyester resin, a polyurethane resin, and an acrylic resin. Of these, the polyester resin is preferred.

The polyester resins are synthesized from dibasic acids and glycols. The dibasic acid components used for the polyester resins according to the present invention are at least one acid selected from the group consisting of aromatic dicarboxylic acids such as terephthalic acid, isophthalic acid, orthophthalic acid and naphthalenedicarboxylic acid; aliphatic dicarboxylic acids such as succinic acid, adipic acid and sebacic acid, and alicyclic dicarboxylic acids such as cyclohexanedicarboxylic acid. Of these, preferred are the aromatic dicarboxylic acids such as terephthalic acid, isophthalic acid, and naphthalenedicarboxylic acid.

Used as the glycol component are aliphatic, alicyclic and aromatic glycols such as ethylene glycol, diethylene glycol, triethylene glycol, tetraethylene glycol, propylene glycol, butanediol, neopentyl glycol, hexanediol, cyclohexanediol, cyclohexanedimethanol, and bisphenol A. Among these, preferred are ethylene glycol and diethylene glycol.

The polyurethane resins used in the present invention can be prepared from polyols, diisocyanates and chain extending agents by conventional methods. Used as the above polyols are polyesterpolyol, polyetherpolyol and polycarbonatepolyol. Diisocyanates used in the present invention are not specifically limited, and there can be conventional ones, such as tolulenediisocyanate, hexamethylenediisocyanate, diphenylmethanediisocyanate, xylenediisocyanate, and cyclohexanediisocyanate. There can be used as the chain extending agent polyhydric alcohols, aliphatic polyamines, allcyclic polyamines and aromatic polyamines.

These resins are preferably provided with polar groups in order to lower the elution amount to MEK/-cyclohexanone. The preferable polar group for the resins of the undercoating layer is selected from at least one of —COOM, —SO₃M, —PO₃M₂, —OSO₃M, and —OPO₃M₂, in which M represents a hydrogen atom, an alkali metal ion or an ammonium ion. The amount of the polar group is preferably 0.1 meq/g to 3 meq/g and particularly preferably 0.15 meq/g to 1.5 meq/g.

The molecular weight thereof is preferably 10,000 to 100,000, more preferably 30,000 to 60,000 in terms of a weight average molecular weight. If the polar group is present in a greater amount and the molecular weight is too high, the resins become difficult to coat a coating solution since the resins become difficult to dissolve in organic solvents.

Tg is preferably 0° to 100° C., more preferably 40 to 80° C. Too low Tg causes blocking in the course of the production steps.

The magnetic recording medium of the present invention has the following composition. In the case of a ferromagnetic powder-coating type magnetic recording medium, there are no specific limitations to the composition (iron oxide, cobalt-containing iron oxide, alloy containing iron as the primary component, and barium ferrite), size and surface treatment of the ferromagnetic powders used. The form of the ferromagnetic powders also is not specifically limited, and usually the ones of acicular form, grain-form, dice-form, ellipsoidal form and plate-form are used.

The binders used for forming a magnetic layer in the present invention can be selected from the conventional binders. The examples of the binders include a vinyl chloride-vinyl acetate copolymer, a copolymer of vinyl chloride, vinyl acetate and vinyl alcohol, maleic acid and/or acrylic acid, a vinyl chloride-vinylidene chloride copolymer, a vinyl chloride-acrylonitrile copolymer, an ethylene-vinyl acetate copolymer, a cellulose derivative such as nitro-cellulose, an acrylic resin, a polyvinyl acetal resin, a polyvinyl-butyral resin, an epoxy resin, a phenoxy resin, a polyurethane resin, and a polycarbonate-polyurethane resin. Preferred are the resins prepared by introducing into the above enumerated resins at least one polar group of —COOM, —SO$_3$M, —PO$_3$M$_2$, —OSO$_3$M, and —OPO$_3$M$_2$, in which M represents a hydrogen atom, an alkali metal ion or an ammonium ion, provided that when plural M's are involved in one group, they may be different from each other. The content of the polar group is preferably $1\times10^{-6}$ to $1\times10^{-4}$ eq/g of resin. The above enumerated high molecular binders are used singly or in combination of several kinds thereof, and they are often subjected to a hardening treatment using a publicly known crosslinking agent of an isocyanate type.

Further, the binders in which oligomers and monomers of an acrylic acid ester-type are used as a binder and hardened with irradiation of radioactive ray are applied to the undercoating layer in the present invention. The content of the binders contained in the magnetic layer of the magnetic recording medium of the present invention is usually 10 to 60 parts by weight, preferably 20 to 40 parts by weight per 100 parts by weight of the ferromagnetic powders.

Further, the magnetic layer of the magnetic recording medium of the present invention preferably contains inorganic particles having the Moh's hardness of 5 or more. The inorganic particles used are not specifically limited as long as they have the Moh's hardness of 5 or more. The examples of the inorganic particles with Moh's hardness of 5 or more are Al$_2$O$_3$ (Moh's hardness: 9), TiO$_2$ (Moh's hardness: 5), TiO (Moh's hardness: 6.5), SiO$_2$ (Moh's hardness: 7), SnO$_2$ (Moh's hardness: 6.5), Cr$_2$O$_3$ (Moh's hardness: 9), and α-Fe$_2$O$_3$ (Moh's hardness: 5.5). They can be used singly or in combination thereof.

Particularly preferred are the inorganic particles having Moh's hardness of 8 or more. Where the inorganic particles having Moh's hardness of lower than 5, the inorganic particles are more easily dropped out from the magnetic layer, head clogging takes place, and running durability is deteriorated due to almost no abrasive action.

The addition amount of the inorganic particles is usually in the range of 0.1 to 20 parts by weight, and more preferably 1 to 10 parts by weight, per 100 parts by weight of the ferromagnetic powders. Further, the magnetic layer preferably contains carbon black having especially an average grain size of 10 to 300 nm (nm: $1\times10^{-9}$ m) in an amount of preferably 1 to 8 parts by weight per 100 parts by weight of the ferromagnetic powders in addition to the above inorganic particles.

Next, the examples of manufacturing the magnetic recording medium of the present invention are described. First of all, an undercoating layer is coated on a non-magnetic support. The polymers used for the undercoating solution are dissolved in suitable solvents, for example, cyclohexanone, MEK, acetone, MIBK, and butyl acetate, and then dried. The coating can be made utilizing conventional methods.

Next, the ferromagnetic powders, binder and other fillers and additives, if necessary, are kneaded with a solvent to prepare a magnetic coating solution. The solvents usually used for preparing the magnetic coating solution may also be used as the solvent in kneading. The kneading methods are not specifically limited, and the addition order of the respective components can be arbitrarily settled. There may be taken the method in which the binder, solvent and ferromagnetic powders are preliminarily kneaded in advance, a hardening agent solution is then added, and a lubricant is finally added in a solution.

The conventional additives such as a dispersant, an antistatic agent and a lubricant can be used in combination in preparing the magnetic coating solution.

The examples of the dispersant include the conventional dispersants such as fatty acids having 12 to 22 carbon atoms, the salts or esters thereof, the compounds prepared by substituting a part or all of the hydrogen atoms of the above compounds with fluorine atoms, amides of the above fatty acids, aliphatic amines, higher alcohols, polyalkylene oxide alkylphosphoric acid esters, alkylphosphoric acid esters, alkylboric acid esters, sarcosinates, alkylether esters, trialkylpolyolefins, quaternary oxyammonium salts, and lecithin. Where the dispersant is used, it is usually used in the range of 0.1 to 10 parts by weight per 100 parts by weight of the ferromagnetic powders.

The examples of the antistatic agent include the electroconductive fine powders such as carbon black and carbon black-grafted polymer; natural surfactants such as saponin; cationic surfactants such as higher alkylamines, quaternary ammonium salts, the salts of pyridine and other hetero compounds, and phosphoniums or sulfoniums; anionic surfactants containing a carboxylic acid group, a phosphoric acid group, a sulfuric acid ester group, and a phosphoric acid ester group; and amphoteric surfactants such as amino acids, aminosulfonic acids, and sulfuric acid or phosphoric acid esters of aminoalcohols. Where the above electroconductire fine powders are used as the antistatic agent, they are used in the range of 0.1 to 10 parts by weight per 100 parts by weight of the ferromagnetic powders. Similarly, the surfactants are added in the range of 0.12 to 10 parts by weight per 100 parts by weight of the ferromagnetic powders.

The above functions of the additives, such as a dispersant, antistatic agent and lubricant are not strictly limited to those described above, and, for example, the dispersants can act as a lubricant or antistatic agent. Accordingly, it is a matter of course that the effects of the compounds shown in the classification are not limited to the matters in the above classification, and where the substances having plural effects are used, the addition amounts thereof are preferably decided considering the effects thereof.

The magnetic coating solution thus prepared is coated on the undercoating layer. The thickness of the magnetic layer thus formed is generally 0.5 to 10 μm, and it is preferably in the thin magnetic layer with a thickness of from 0.5 to 3.5 μm that the effect of the undercoating layer, according to the present invention, can be markedly demonstrated. Further, it is in the magnetic layer smoothness of 5 nm or less, expressed in terms of a centerline average roughness (Ra) (a cutoff value: 0.25 mm) according to JIS B 0601, that the effect of the smoothness of the undercoating layer, according to the present invention, can be clearly seen. Accordingly, the effect of the smoothness of the present invention can be first obtained when the thin and very smooth magnetic layer and undercoating layer are combined. However, it goes without saying that the effect of the adhesive strength between the non-magnetic support and magnetic layer can be demonstrated with a conventional magnetic layer.

The magnetic recording medium of the present invention may be of a multilayer type in which the plural magnetic layers are provided. Further, a back coating layer may be provided on the side of the non-magnetic support opposite the magnetic layer. In this case, the undercoating layer according to the present invention may be preferably provided between the non-magnetic support and back coating layer. The thickness of the back coating layer is 0.1 to 2 μm, preferably 0.3 to 1 μm. The conventional back coating layers can be applied.

The details of the methods for dispersing the above ferromagnetic powders and binder and coating the magnetic coating solution on the non-magnetic support are described in JP-A-54-46011 and JP-A-54-21805.

Where the magnetic recording medium is used in the form of a tape, the magnetic layer coated on the non-magnetic support is usually subjected to a treatment in which the ferromagnetic powders contained in the magnetic layer are oriented, that is, to a magnetic (field) orientation treatment, and then dried. On the contrary, in the case of a disc-form medium, the magnetic layer is subjected to a non-orientation treatment with a magnetic field in order to remove an anisotropy of the magnetic characteristics. Then, it is subjected to a surface smoothing treatment, if desired.

The thickness of the magnetic layer thus formed is generally 0.5 to 10 μm. It is preferably in the thin magnetic layer having a thickness of from 0.5 to 3.5 μm that the effect of the smoothness of the undercoating layer according to the present invention can be markedly shown. Further, it is in the magnetic layer having the smoothness of 5 nm or less in terms of Ra (cutoff value: 0.25 ram) that the effect of the smoothness of the undercoating layer according to the present invention can be clearly seen. It is not until the thin and very smooth magnetic layer and the undercoating layer according to the present invention are combined that the effect of the smoothness can be demonstrated. However, it goes without saying that the effect of the adhesive strength between the non-magnetic support and magnetic layer can be demonstrated with a conventional magnetic layer.

EXAMPLES

The present invention will be concretely explained with reference to the examples but not limited thereto. The term "parts" in the examples means parts by weight.

EXAMPLES AND COMPARATIVE EXAMPLES

After kneading the following components with a ball mill for 48 hours, the mixture was filtered using a filter having an average pore size of 1 μm to prepare the magnetic coating solution. Next, the resins shown in Table 1, which were dissolved in the mixed solvent of MEK and cyclohexanone (2:8 by weight ratio) were coated, respectively, on a non-magnetic support of polyethylene terephthalate film having thickness 10 μm so that the dry thickness thereof was 0.1 μm, followed by drying. Then, the magnetic coating solution thus prepared was coated thereon with a reverse roll so that the dry thickness became as shown in Table 2. The undercoating layer was not provided only in Comparative Example 1.

| Composition of the Magnetic Coating Solution | |
|---|---|
| Ferromagnetic metal powder (composition: Fe: 94%, Zn: 4%, Ni: 2%; Hc: 1,500 Oe; specific surface area: 54 m$^2$/g) | 100 parts |
| Polyesterpolyurethane (weight average molecular weight: 40,000; number average molecular weight: 25,000; average two —SO$_3$Na groups per molecule) | 5 parts |
| Vinyl chloride copolymer (MR110 manufactured by Nippon Zeon Co., Ltd.; polymerization degree: 320; having an —SO$_3$K group, an epoxy group and an —OH group) | 12 parts |
| Abrasive (α-alumina, average grain size: 0.3 μm) | 5 parts |
| Stearic acid | 1 part |
| Oleic acid | 1 part |
| Butyl stearate | 2 parts |
| Carbon black (average grain size: 40 nm) | 2 parts |
| Methyl ethyl ketone | 200 parts |
| Cyclohexanone | 100 parts |

The non-magnetic support coated thereon with the magnetic layer was subjected to a magnetic (field) orientation with the magnet of 3,000 gauss in a wet state, and after drying, was further subjected to a super calendering treatment, followed by slitting it in the width of 8 mm, whereby a video tape sample was prepared.

The video tape sample thus prepared was subjected to the following tests to obtain the results shown in Table 2.

Test 1

Adhesive Strength

An adhesive tape was adhered on the surface of the magnetic layer, and then the tape was peeled at the angle of 180° to the non-magnetic support to measure the adhesive strength.

Test 2

Powder Drop from the Magnetic Layer in Running

The video tape sample was repeatedly run 200 passes in the environment of 23° C. and 5% RH in a VTR FUJIX8 manufactured by Fuji Photo Film Co., Ltd., and the presence of the powders dropped from the tape edge of the magnetic layer was observed. The results were classified to B and G, wherein B means the presence of the dropped powders and G means the absence of the dropped powders.

Test 3

Chroma S/N

Recording and playback (reproduction) were carried out in the same VTR as that used in Test 2 to measure chroma S/N with an S/N meter. The results are expressed by the value relative to that of Comparative Example 1, which is set at 0 dB.

MEASUREMENT OF AN ELUTION AMOUNT

A PET film substrate cast thereon with a resin layer was placed in the mixed solvent of MEK and cyclohexanone (1:1 by weight ratio) at 25° C. and was taken out 30 seconds later to measure the eluted amount. The eluted amounts are expressed in terms of per $cm^2$ of the surface.

TABLE 1

| Example No. | Resin for Undercoating | Molecular Weight | Polar Group (meq/g) | Tg (°C.) | Elution Amount ($mg/cm^2$) |
| --- | --- | --- | --- | --- | --- |
| 1 to 4 | Polyester (EG/DEG/TP/IT) | 53,000 | $SO_3Na$ (0.2) | 62 | 0.13 |
| 5 | Polyester (EG/DEG/TP/IT) | 61,000 | $SO_3Na$ (0.1) | 58 | 0.40 |
| 6 | Polyester (EG/DEG/TP/IT) | 42,000 | $SO_3Na$ (0.8) | 60 | 0.05 |
| 7 | Polyester (EG/DEG/TP/IT) | 45,000 | $OPO_3Na_2$ (0.2) | 45 | 0.21 |
| 8 | Polyurethane (EG/TEG/MDI) | 72,000 | COONa (2) | 70 | 0.09 |
| 9 | Polyester (EG/DEG/TP/IP) | 49,000 | $SO_3Na$ (3) | 60 | 0.02 |
| Comp. 1 | None | — | — | — | — |
| Comp. 2 to 5 | Polyester (FUJI FILM STAFIX) | — | None | 28 | 0.53 |
| Comp. 6 | Polyester (EG/DEG/TP/IP) | 50,000 | $SO_3Na$ (4) | 60 | 0.01 |

TABLE 2

| Example No. | Magnetic Layer Thickness (nm) | Ra (nm) | Adhesive Strength | Powder Drop | Chroma S/N |
| --- | --- | --- | --- | --- | --- |
| 1 | 4.0 | 3.5 | 98 | G | 0.1 |
| 2 | 3.5 | 3.4 | 110 | G | 0.0 |
| 3 | 3.0 | 3.5 | 120 | G | 0.2 |
| 4 | 2.0 | 3.5 | 135 | G | 0.0 |
| 5 | 3.5 | 3.5 | 82 | G | 0.1 |
| 6 | 3.5 | 3.5 | 96 | G | 0.0 |
| 7 | 3.5 | 3.5 | 125 | G | 0.0 |
| 8 | 3.5 | 3.5 | 108 | G | 0.0 |
| 9 | 3.5 | 3.5 | 90 | G | 0.0 |
| Comp. 1 | 3.5 | 3.5 | 0 | B | 0 |
| Comp. 2 | 4.0 | 3.7 | 28 | B | −0.3 |
| Comp. 3 | 3.5 | 5.0 | 36 | B | −0.7 |
| Comp. 4 | 3.0 | 5.9 | 40 | B | −1.1 |
| Comp. 5 | 2.0 | 6.7 | 45 | B | −1.5 |
| Comp. 6 | 3.5 | 3.5 | 50 | B | 0.0 |

As is apparent from the results in Tables 1 and 2, the video tape samples provided with the undercoating layer according to the present invention have a large adhesive strength of the magnetic layer and no powder drop at all. Further, it has been found that the high electromagnetic characteristics can be maintained without the deterioration of the surface roughness of the magnetic layer.

EFFECTS OF THE INVENTION

In the present invention, the resins having the elution amount of 0.05 to 0.40 $mg/cm^2$ when placed in a solvent of methyl ethyl ketone and cyclohexanone (1:1 by weight ratio), are used so that the binders used for the undercoating layer are less eluted even by the solvents having a high dissolving power (which are used for the magnetic coating solution); whereby the magnetic layer having an excellent adhesiveness and surface property can be provided and the electromagnetic characteristics can be improved. Thus, in the present invention, the binder having the elution amount falling within the prescribed range, when placed in the mixed solvent of methyl ethyl ketone and cyclohexanone, is used for the undercoating layer in order to prevent the undercoating layer itself from eluting and diffusing to the solvent contained in the magnetic coating solution during the period of coating the magnetic coating solution on the undercoating layer and drying. Moreover, this embodiment allows the adhesiveness of the magnetic layer with the non-magnetic support to be sufficiently maintained.

Particularly, the undercoating layer of the present invention, when combined with the thin and super-smooth magnetic layer (which is popular in recent years), can prevent the eluting or uneven swelling between the binder and solvent contained in the magnetic layer so as to prevent the deterioration in smoothness of the magnetic layer.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having thereon an undercoating layer and a magnetic layer, wherein the undercoating layer is provided between the non-magnetic support and magnetic layer, and a binder used for the undercoating layer comprises a resin having an elution amount of 0.05 to 0.4 $mg/cm^2$ when placed in a mixed solvent of methyl ethyl ketone and cyclohexanone having a weight ratio of 1:1 at 25° C. for 30 seconds, and wherein the magnetic layer comprises a binder which contains a resin having at least one polar group selected from the group consisting of —COOM, —$SO_3M$, —$PO_3M_2$, —$OSO_3M$ and —$OPO_3M_2$ in which M represents a hydrogen atom, an alkali metal ion or an ammonium ion; and said binder used for the undercoating layer is a resin containing 0.1 meq/g to 3.0 meq/g of at least one polar group selected from the group consisting of —COOM, —$SO_3M$, —$PO_3M_2$, —$OSO_3M$ and —$OPO_3M_2$, in which M represents a hydrogen atom, an alkali metal ion, or an ammonium ion.

2. A magnetic recording medium as in claim 1, wherein the resin having a polar group, which is used in the undercoating layer, has an elution amount of 0.4 mg/cm$^2$ or less to a solvent used for the magnetic layer.

3. A magnetic recording medium as in claim 1, wherein the magnetic layer has a centerline average surface roughness (Ra) of 5 nm or less.

4. A magnetic recording medium as in claim 1, wherein the non-magnetic support is selected from the group consisting of polyethylene terephthalate, polyethylene naphthalate, polyamide, polyaromatic amide, polyimide, and polyamide imide.

5. A magnetic recording medium as in claim 1, wherein the non-magnetic support has a thickness of 2.5 to 100 μm.

6. A magnetic recording medium as in claim 1, wherein the non-magnetic support has a centerline average surface roughness of 10 nm or less.

7. A magnetic recording medium as in claim 1, wherein the undercoating layer has a thickness of 0.01 to 0.20 μm.

8. A magnetic recording medium as in claim 1, wherein the resin used for the undercoating layer is a polyester resin.

9. A magnetic recording medium as in claim 1, wherein the resin to be used in the undercoating layer has a weight average molecular weight of 10,000 to 100,000.

10. A magnetic recording medium as in claim 1, wherein the resin to be used in the undercoating layer has a glass transition point (Tg) of 0 to 100° C.

11. A magnetic recording medium as in claim 1, wherein the magnetic layer has a thickness of 0.5 to 10 μm.

12. A magnetic recording medium as in claim 1, wherein the magnetic layer has a thickness of from 0.5 to 3.5 μm.

* * * * *